US00RE45354E

(19) United States
(12) Reissued Patent
Morgan

(10) Patent Number: US RE45,354 E
(45) Date of Reissued Patent: Feb. 3, 2015

(54) LUMINAIRE

(71) Applicant: David Morgan, London (GB)

(72) Inventor: David Morgan, London (GB)

(73) Assignee: Beta-Calco Inc., Toronto, ON (CA)

(21) Appl. No.: 29/438,541

(22) Filed: Nov. 30, 2012

Related U.S. Patent Documents

Reissue of:
(64) Patent No.: Des. 662,645
Issued: Jun. 26, 2012
Appl. No.: 29/401,023
Filed: Sep. 6, 2011

(30) Foreign Application Priority Data

Mar. 11, 2011 (CA) ..... 139618
May 4, 2011 (CA) ..... 140422

(51) LOC (10) Cl. ..... 26-03
(52) U.S. Cl.
USPC ..... D26/84; D26/90
(58) Field of Classification Search
USPC ..... D26/80, 81, 84, 86, 90, 92, 128, 135, D26/136, 146, 147; 362/80, 81, 82, 136
See application file for complete search history.

(56) References Cited

U.S. PATENT DOCUMENTS

| | | | | | |
|---|---|---|---|---|---|
| D86,420 | S | * | 3/1932 | Sutter | D26/88 |
| D134,355 | S | * | 11/1942 | Rolph | D26/88 |
| D242,943 | S | * | 1/1977 | Lazerson | D26/88 |
| D328,955 | S | * | 8/1992 | Sheradsky | D26/88 |
| D370,545 | S | * | 6/1996 | Porter | D26/88 |
| D459,525 | S | * | 6/2002 | Barry | D26/88 |
| D469,562 | S | * | 1/2003 | Crasset | D26/90 |
| D566,320 | S | * | 4/2008 | Kim | D26/88 |
| D574,546 | S | * | 8/2008 | Morrison | D26/88 |
| D593,704 | S | * | 6/2009 | Lovegrove | D26/90 |
| D602,191 | S | * | 10/2009 | Chang et al. | D26/84 |
| D602,192 | S | * | 10/2009 | Tunze | D26/88 |
| D627,502 | S | * | 11/2010 | Zheng et al. | D26/72 |
| D635,292 | S | * | 3/2011 | Chiang et al. | D26/88 |

* cited by examiner

*Primary Examiner* — Phillip S Hyder
(74) *Attorney, Agent, or Firm* — Renner, Otto, Boisselle & Sklar, LLP

(57) CLAIM

The ornamental design for a luminaire, as shown and described.

DESCRIPTION

FIG. 1 is a perspective view of the luminaire according to my new design;
FIG. 2 is a bottom view of the luminaire shown in FIG. 1;
FIG. 3 is a side view of the luminaire shown in FIG. 1;
FIG. 4 is a top view of the luminaire shown in FIG. 1;
FIG. 5 is a perspective view of the luminaire showing a variant of my new design;
FIG. 6 is a bottom view of the luminaire shown in FIG. 5;
FIG. 7 is a side view of the luminaire shown in FIG. 5; and,
FIG. 8 is a top view of the luminaire shown in FIG. 5.

1 Claim, 2 Drawing Sheets

Figure 2:
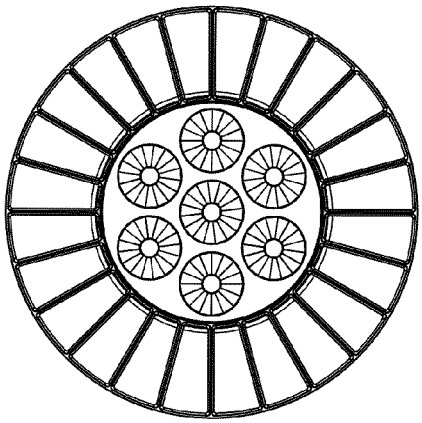
Figure 4:
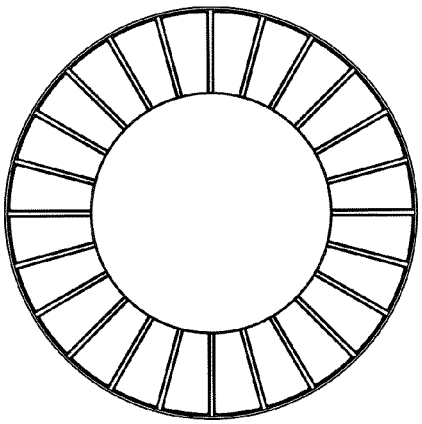
Figure 3:
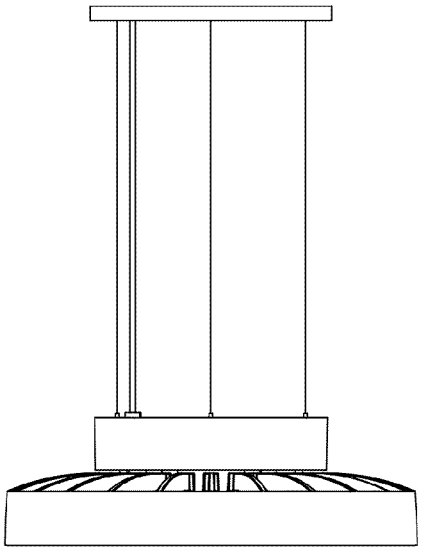
Figure 6:
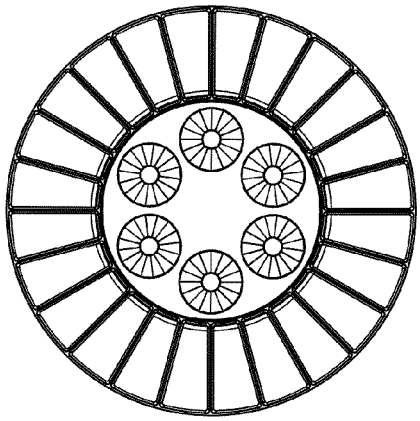
Figure 8:
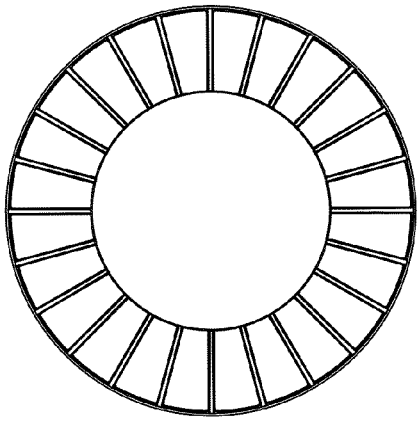
Figure 7:
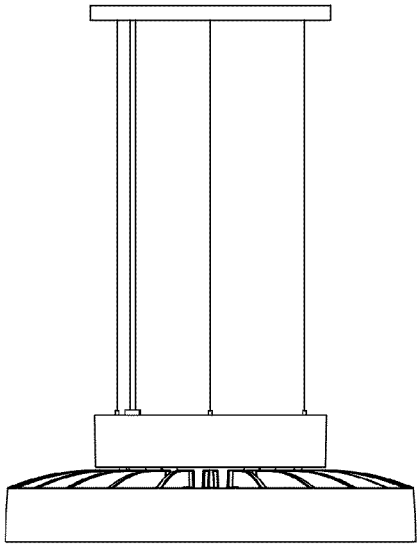

Matter enclosed in heavy brackets [ ] appears in the original patent but forms no part of this reissue; matter printed in italics indicates the additions made by reissue.

AMENDED

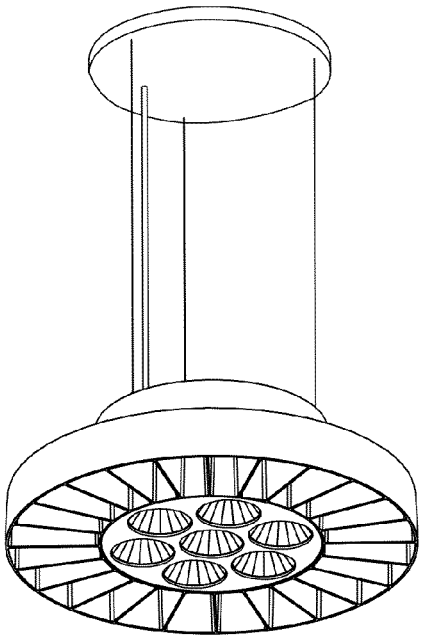
FIG. 1
AMENDED

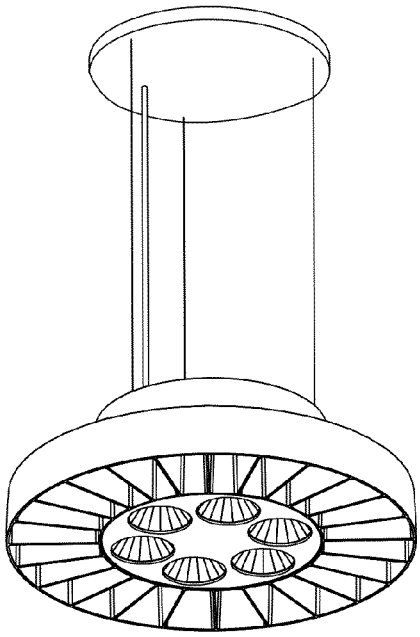
FIG. 5
AMENDED